United States Patent [19]

Von Benda et al.

[11] Patent Number: 4,687,719

[45] Date of Patent: Aug. 18, 1987

[54] METALLIZED SYNTHETIC RESIN FIBER ELECTRODE STRUCTURE BASED ON NONWOVEN FABRIC FOR BATTERY ELECTRODES

[75] Inventors: Klaus Von Benda, Nuertingen; Claus Schneider, Fellbach, both of Fed. Rep. of Germany

[73] Assignee: Deutsche Automobilgesellschaft mbH, Hannover, Fed. Rep. of Germany

[21] Appl. No.: 610,779

[22] Filed: May 16, 1984

[30] Foreign Application Priority Data

May 21, 1983 [DE] Fed. Rep. of Germany ....... 3318629

[51] Int. Cl.$^4$ .................. H01M 4/72; H01M 4/80
[52] U.S. Cl. .................. 429/234; 429/235; 429/236; 429/245
[58] Field of Search .................. 429/234–237, 429/245

[56] References Cited

U.S. PATENT DOCUMENTS

| | | | |
|---|---|---|---|
| 3,926,671 | 12/1975 | Gutjahr | 136/29 |
| 4,223,081 | 9/1980 | Faber | 429/234 |
| 4,350,580 | 9/1982 | Kadija | 204/279 |
| 4,356,242 | 10/1982 | Doniat | 429/234 |
| 4,432,838 | 2/1984 | Kadija | 204/11 |
| 4,439,916 | 4/1984 | Faber | 429/234 X |
| 4,464,446 | 8/1984 | Berger et al. | 429/235 X |

Primary Examiner—Brian E. Hearn
Assistant Examiner—Stephen J. Kalafut
Attorney, Agent, or Firm—Barnes & Thornburg

[57] ABSTRACT

A metallized synthetic resin fiber electrode structure is described, based on a nonwoven fabric, with a porosity of 85–96% and a fiber thickness of 10–30 μm, determined, respectively, in the nonmetallized condition, wherein the nonmetallized nonwoven fabric is characterized by the following strength properties. The quotient of the flexural stiffness according to DIN 53 362 (cantilever test) and the square of the nonwoven fabric thickness according to DIN 53 855 ranges between 80 and 400 cN. The deformation of a sample stack in the 5th cycle under 200 N in the compression test according to DIN 54 305 amounts to 6–18 mm. The force required to obtain half the achieved deformation amounts to 30–70 N. Polypropylene needle felts are preferred having a metallic coating of 0.1–10 μm, especially 1–6 μm. The electrode structures according to this invention can also be manufactured with larger thicknesses and permit production of rugged electrodes having reproducible properties.

14 Claims, No Drawings

METALLIZED SYNTHETIC RESIN FIBER ELECTRODE STRUCTURE BASED ON NONWOVEN FABRIC FOR BATTERY ELECTRODES

TECHNICAL FIELD

The invention relates to a synthetic fiber structure which is utilized, after a chemical (electroless) deposition and optionally, subsequent electroplating metallizing operation, as an electrode structure for galvanic cells or batteries.

DESCRIPTION OF THE PRIOR ART

Electrode structures serve two tasks in the electrodes of galvanic elements, namely for supporting and for contacting of the active material. In order to achieve these objectives, the structure should possess sufficient strength and its surface area should be maximally large. The widespread quasi two-dimensional structures, such as meshworks, expanded grids, and cast grids, though inexpensive and rugged, exhibit, however, only a relatively small surface area. These disadvantages are extensively avoided by three-dimensional sintered structures produced by sintering metallic powders in he presence of inert fillers which subsequently must be removed again. This method of production, however, is expensive and is connected with technical difficulties in structures having a thickness of more than 1 mm.

Therefore, attempts have been made for some time to produce three-dimensional, so-called reticulated electrode structures in some other way, generally by metallizing non-metallic substrates. In this context, a distinction is suitably made between foam and fiber structure components.

Suitable plastic foams, advantageously of polyurethane, serve as the substrate for structured foam components. These foams are coated with a metal and then sintered. During this step, the synthetic resin is subjected to pyrolysis, and a reproduction of the original plastic foam is created which consists entirely of metal. Structured elements of this type have been known, for example, from German Offenlegungsschrift No. 2,427,422 and U.S. Pat. No. 3,926,671.

Fibrous structured elements can be produced from metallic fibers, by metallizing nonmetallic, individual fibers and subsequent production of a coherent structure, or by metallizing finished, non-metallic molded fiber structures. In the literature, sintering is frequently mentioned for both methods as an additionally required strengthening process, organic as well as inorganic fiber substrates having been suggested. In case of using carbon fibers, the structure can be sintered while preserving the carbon fiber core (See, for example, German Auslegeschrift No. 1,071,788 or U.S. Pat. No. 4,215,190.), or alternatively, the carbon fiber can be removed by a suitable oxidative treatment (See French Pat. No. 2,058,732.), and the remaining metallic fiber skeleton can be sintered. Glass fibers have been proposed as the inorganic fiber substrates for metallizing (German Auslegeschrift No. 1,016,335).

Sintered fiber structures of metallic fibers are produced, for example, by cutting apart types of steel into steel fibers which are subsequently processed into electrode structures. However, only relatively thick fibers can be produced in this way, and, as compared with other techniques, coarse structures having a small internal surface area are obtained. Additionally, selection of material is essentially restricted to materials which can be subjected to cutting. In particular, nickel, which is of great importance in battery technology, cannot be processed into fibers in this way. Rather, steel fibers are nickel-plated.

Finally, electrode structures have also been suggested which contain fibers as well as sintered metallic particles, so that this type of structure can be considered a transitional form of the classical, powder-metallurgical sintered electrode. The fibers can be nonconductive, for example, they can be made of asbestos or glass (U.S. Pat. No. 2,610,220), but they can also be made of graphite (German Offenlegungsschrift No. 1,671,475). Finally, fibers as well as powder particles can consist of metallized non-metals, such as graphite, and can be bonded by sintering (German Pat. No. 1,596,211).

Among the above-described electrode structures, electrode structures with electrode structure substrates made of synthetic resin fibers are technically especially preferred, because large internal surface areas can be realized on account of the fiber fineness grades possible in textile technology. Suitable synthetic resin fibers are, for example, PVC fibers, polyamide fibers (German Auslegeschrift No. 1,596,240), and polyolefin fibers, especially polypropylene fibers which possess especially advantageous properties (WI. ReKsċ et al., 32nd ISE Meeting 1981, Extended Abstracts). However, the fineness of the fiber makes it difficult to impart to the structure the strength required for direct current collection so that, in the two last-mentioned literature citations, a firmer, metallic auxiliary skeleton is in contact with the fiber body and serves for current collection.

It is obvious that the use of a fibrous element, prefabricated as known in the textile art, as the starting substrate in place of a loose mass of staple fibers is advantageous because the textile shaping procedure is simpler and cheaper than a sintering operation. However, metallizing of thicker substrates becomes increasingly more expensive as compared to metallizing of individual fibers, although this process can be carried out without any problems in accordance with the method described in German Pat. No. 2,418,742.

It is furthermore desirable to design the textile shaping step as simple and as inexpensive as possible. For this reason, so-called nonwovens are to be preferred for electrode support structures, i.e., nonwoven mats which can be subdivided according to their mode of manufacture into wet fleece fabrics, dry fleece fabrics, and spunbonded fabrics (See, in this connection, Albrecht Lü nenschloss, "Vliesstoffe" [Nonwoven Fabrics], Georg Thieme Publishers, 1982, Stuttgart, introduction, pages 1-3, hereby incorporated by reference.). A distinction must be made between the primary product, a fibrous fleece, which can be fashioned in dependence on the orientation of the fibers as a random-fiber fleece, a crossed-fiber fleece, or an oriented fleece with a preferential fiber direction, and the textile nonwoven fabric, as the secondary product, manufactured therefrom by densification (See, in this connection, Lünenschlos, loc. cit., p. 68.). A preferential fiber direction for the latter product can readily be provided by known textile technology. It is, of course, advantageous for current derivation in electrode structures to orient a majority of the fibers approximately in parallel to the current direction, as has been described already for metallic fiber structures in British Pat. No. 1,109,524.

It has been known from Austrian Pat. No. 215,508, for example, to manufacture electrode structures based on non-woven material wherein the nonmetallized nonwoven material has a porosity of 85-96% and a small fiber thickness of 10-30 μm. However, it was found that even if these values are maintained, the nonwoven material is very frequently unsuited as a base for the electrode structure because the thus-produced electrode structures often show deficiencies with respect to reproducibility and dimensional stability of the finished electrodes, accompanied by greatly varying lifetimes in cyclic operation. The cause for this is an unforseeable behavior of the nonwoven material with regard to the unavoidable mechanical stresses occurring in the practical manufacture of the electrode structure, but also in the finished electrode with regard to the mechanical stresses during cycling on account of the change in volume of the active material which, in combination, leads to the above-described disturbances in the finished electrodes. This unforeseeable behavior occurs the more frequently, the thicker the nonwoven material, especially at nonwoven thicknesses of above 0.5 mm.

Therefore, it is an object of the invention to provide a metallized synthetic fiber electrode structure which is mechanically rugged and makes it possible to produce electrodes having good dimensional stability and readily reproducible values. Furthermore, the electrode structure is to exhibit a small fiber thickness and is to have the above-described properties even with a small thickness of the metallic coating.

SUMMARY OF THE INVENTION

According to the invention, the dimensional stability favorable for electrode structures can be obtained for nonwoven fabrics with about 85-96% porosity and a fiber thickness of about 10-30 μm by imparting to them the strength having the following characteristic values: the quotient of the flexural stiffness according to DIN 53 362 (cantilever test) and the square of the nonwoven fabric thickness according to DIN 53 855 ranges between about 80 and 400 cN, and the deformation of the sample stack obtained in the 5th cycle under 200N in the compression test according to DIN 54 305 ranges between about 6 and 18 mm, wherein the force required to achieve half this deformation is about 30-70N.

DESCRIPTION OF THE INVENTION

The cantilever flexural stiffness is determined in accordance with DIN 53 362 on test specimens having a width of 25 mm and a length of 250 mm by shifting the test specimen along a horizontal plane over an edge until the portion of the specimen freely projecting beyond the edge touches, by flexing on account of its own weight, a plane inclined by 41° 30' with respect to the horizontal.

The compression test according to DIN 54 305 is performed on a stack made up of 10×10 cm² specimens, the thickness of this stack coming as close as possible to 50 mm. The stack is compressed between rigid plates in a testing device at 50 mm/min until a maximum force of 200N has been reached, and then the force is removed at the same testing rate. Five such testing cycles are executed. For determining the data essential for nonwoven electrode structures, it is sufficient to find out the amount of change in stack height in the 5th cycle between the forces of 0 and 200N, and the amount of the force in the 5th cycle compressing the stack by one-half this amount.

The aforementioned characteristic values can be obtained by many conventional procedures of nonwoven fabric densification, such as, for example, dealt with in the cited book "Vliesstoffe" in chapter 2. Besides the needling technique with and without support material, also to be mentioned are the stitch-bonding technique, the binder application, and thermal strengthening techniques, especially by calendering. However, needled felts of crimped polypropylene staple fibers having a fiber length of 3-10 cm without reinforcing or support material are preferred. The characteristic values are to remain within the claimed range even after the electrode is finished, because the dimensional stability of the structure in the zone of high porosity is particularly important.

A structure compression which may be required for dimensioning the electrode should, therefore, be limited to at most about 15%.

Nonwoven fabrics suitable for electrode structures consist of fibrous materials resistant with respect to the electrolytes, for example, fibers of polyamide, polyvinyl chloride, polystyrene, but especially of polyolefins, such as polyethylene and polypropylene. Polypropylene is particularly preferred.

The nonwoven fabrics can be manufactured in an especially advantageous fashion by the needle felt technique, wherein particularly favorable results are obtained with polypropylene fibers having a length of 3-10 cm.

It is possible to produce, from nonwoven fabrics having the claimed properties, synthetic fiber electrode structures having thicknesses which are substantially greater than usual heretofore, e.g., thicker than 0.8 mm. Because uniform metallizing, however, becomes increasingly more difficult above a nonwoven fabric thickness of 6 mm, this thickness should suitably form the upper limit. In nonwovens, a pronounced anisotropy of mechanical properties occurs frequently in the longitudinal and transverse directions. Therefore, care must be taken that the requirements of this invention regarding the strength are met in all directions.

Metallizing of the rough nonwoven fabrics takes place by the customary methods (See, for example, Prof. Dr.-Ing. R. Weiner, editor, "Kunststoffgalvanisierung" [Synthetic Resin Electroplating], Eugen Leutze Publishers, Saulgau 1973, hereby incorporated by reference.) first by chemical deposition, i.e., electroless preliminary metallizing and then by subsequent reinforcement by electrodeposition of the layer applied in the chemical deposition or electroless fashion. In general, nickel is applied as the metal. The thickness of the metallic coating on the fibers of the nonwoven fabric can be very small, for example, 0.1-10 μm. Average thicknesses of 1-6 μm are preferred.

Metallized synthetic resin fiber electrode structures having a thickness of about 2.5-4.5 mm exhibit, after having been metallized with nickel with the aforementioned thickness, modulus of elasticity values of between 300 and 800N/mm² in a conventional flexing test. However, for very thin electrode structures, the modulus of elasticity can rise very greatly, up to five times the above-mentioned values.

The advantages attainable by this invention reside, above all, in that it has now become possible to manufacture metallized synthetic resin fiber electrode structures, especially also with relatively large thicknesses, whih possess reproducible properties and with the aid of which rugged electrodes having reproducible properties can be manufactured. In this connection, it should also be emphasized that these properties can be attained even with an only minor nickel plating, whereby expenses for the metal not participating in the electrochemical reaction can be saved, and furthermore especially lightweight electrode structures can be produced by the possible, thin metallic coating. This makes it possible, with the same capacity, to manufacture more lightweight electrodes or, with the same electrode weight, electrodes having a higher capacity.

EXAMPLE 1

A needle flet having a thickness of 2.5 mm made of 2.8 dtex polypropylene fiber (fiber thickness about 20 μm) with 92% porosity is superficially calendered for smoothing and densification. In the cantilever test, the quotient of flexural stiffness and the square of felt thickness is 330 cN; in the 5th cycle of the compression test, the felt stack compresses with a maximum load of 200N by 15 mm, and the compressive force required for half this value, i.e., for 7.5 mm, is 43N.

The felt is preliminarily chemically nickel-coated, washed, and by electrodeposition brought to the final nickel coating of 150 mg/cm$^2$, corresponding to the thickness of the nickel layer of 3.4 μm, assuming uniform distribution (however, in most instances there will be found a nonuniform nickel distribution tending toward a thicker outer nickel coat and a thinner internal nickel coat). After the nickel-plating step, the modulus of elasticity is measured on 80×25 mm$^2$ specimens; depending on the uniformity of the nickel distribution, this value ranges between 480 and 740N/mm$^2$. The thickness of the electrode structure increases only spotwise to 2.7 mm in spite of processing and handling. Prior to being impregnated with nickel hydroxide as the active material, the structure is further brought to the desired dimension of 2.5 mm by pressing. Electrodes manufactured from the felt are cycled without problems and exhibit only insubstantial dimensional changes even after hundreds of cycles.

EXAMPLE 2

A needle felt having a thickness of 4.9 mm made of 2.8 dtex polypropylene fiber with 92.5% porosity is superficially calendered for smoothing and densification. The nonwoven material exhibits in the cantilever test two greatly differing characteristic values, on account of a preferred fiber direction, namely 180 cN in parallel to the preferential direction and 80 cN transversely thereto, i.e., with the largest dimension of the specimen being disposed at right angles to the preferred direction. In the 5th cycle of the compression test, the felt stack is compressed by 14 mm under 200N, and the force with a compression stroke of 7 mm is 50N. The felt is nickel-plated as in Example 1, first chemically and then by electrodeposition, until a coating of 245 mg/cm$^2$ is obtained.

After nickel-plating, the thickness of the structure rises to 5.2 mm. The modulus of elasticity, measured as in Example 1, is on the average 320N/mm$^2$.

Nickel oxide test electrodes with this structure are in the most cases dimensionally stable in cyclic experiments; however, under the same impregnating and charging/discharging conditions as in Example 1, bulges are occasionally noticed, pointing to the fact that the strong anisotropy of the felt material lowers the strength in one direction toward the permissible limit. The 80 cN value in the cantilever test corresponds with this direction.

While we have described only two examples in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A metallized synthetic resin fiber electrode structure having a relatively large internal surface area made from a nonwoven metallized fleece-like fabric of synthetic resin fibers, in which the electrode structure has a porosity of 85–96% and a fiber thickness of 10–30 μm, as measured in nonmetallized condition of the fibers, characterized in that to achieve an electrode structure which is mechanically rugged, has good dimensional stability and offers readily reproducible values, the quotient of flexural stiffness, according to DIN 53 362, by a cantilever test and of the square of nonwoven fabric thickness according to DIN 53 855, ranges in the nonwoven fabric in its non-metallized condition between 800 and 400 cN; the deformation of a sample stack in the 5th cycle under 200N in a compression test according to DIN 54 305 amounts to 6–18 mm; and in that the force required to obtain half the deformation amounts to 30–70N so that the metallized synthetic resin fiber electrode structure offers a relatively high strength without the need for a metallic support or for sintering and minimizes reproducibility and dimensional stability problems coupled with improved lifetimes in cyclic operation.

2. The metallized synthetic resin fiber electrode structure according to claim 1, wherein the nonwoven fabric has a thickness of 0.8–6 mm.

3. The metallized synthetic resin fiber electrode structure according to claim 1, wherein the nonwoven fabric consists of a needle felt of polyolefin fibers having a fiber length of 3–10 cm.

4. The metallized synthetic resin fiber electrode structure according to claim 1, wherein the average thickness of a metallic coating on the fibers of the nonwoven fabric is between 0.1–10 μm.

5. The metallic synthetic resin fiber electrode structure according to claim 3, wherein the needle felt is of polypropylene fibers.

6. The metallized synthetic resin fiber electrode structure according to claim 4, wherein the average thickness of the metallic coating on the fibers of the nonwoven fabric is between 1–6 μm.

7. The metallized synthetic resin fiber electrode structure according to claim 4, wherein the metal coating essentially consists of nickel.

8. The metallized synthetic resin fiber electrode structure according to claim 1, wherein the nonwoven fabric is a needle felt of polyamide, polyvinyl chloride, or polystyrene.

9. A metallized synthetic resin fiber electrode according to claim 1, wherein the nonwoven fabric has a thickness greater than 0.5 mm.

10. A metallized synthetic resin fiber electrode structure according to claim 9, wherein the nonwoven fabric has a thickness of about 0.8 to 6 mm.

11. A metallized synthetic resin fiber electrode structure according to claim 9, wherein the average thickness of a metallic coating on the fibers of the nonwoven fabric is between 0.1–10 μm.

12. A metallized synthetic resin fiber electrode structure according to claim 11, wherein the average thickness of the metallic coating on the fibers of the nonwoven fabric is between 1–6 μm.

13. A metallized synthetic resin fiber electrode structure according to claim 11, wherein the nonwoven fabric is a needle felt of polyamide, polyvinyl chloride, or polystyrene.

14. A metallized synthetic resin fiber electrode structure according to claim 11, wherein the nonwoven fabric consists of a needle felt of polyolefin fibers having a fiber length of 3–10 cm.

* * * * *